(12) United States Patent
Vissers

(10) Patent No.: US 11,876,212 B2
(45) Date of Patent: Jan. 16, 2024

(54) MOLTEN FLUID APPARATUS WITH SOLID NON-BRITTLE ELECTROLYTE

(71) Applicant: Vissers Battery Corporation, Wheaton, IL (US)

(72) Inventor: Daniel R. Vissers, Wheaton, IL (US)

(73) Assignee: Vissers Battery Corporation, Wheaton, IL (US)

( * ) Notice: Subject to any disclaimer, the term of this patent is extended or adjusted under 35 U.S.C. 154(b) by 23 days.

(21) Appl. No.: 17/579,918

(22) Filed: Jan. 20, 2022

(65) Prior Publication Data

US 2022/0149348 A1   May 12, 2022

Related U.S. Application Data

(63) Continuation of application No. 15/982,475, filed on May 17, 2018, now Pat. No. 11,264,603.

(51) Int. Cl.
| | |
|---|---|
| *H01M 4/136* | (2010.01) |
| *H01M 4/04* | (2006.01) |
| *H01M 4/1397* | (2010.01) |
| *H01M 10/39* | (2006.01) |
| *H01M 10/63* | (2014.01) |
| *H01M 4/02* | (2006.01) |

(52) U.S. Cl.
CPC ......... *H01M 4/136* (2013.01); *H01M 4/0471* (2013.01); *H01M 4/1397* (2013.01); *H01M 10/39* (2013.01); *H01M 10/63* (2015.04); *H01M 2004/027* (2013.01); *H01M 2004/028* (2013.01)

(58) Field of Classification Search
CPC ........... H01M 10/052; H01M 10/0562; H01M 10/39; H01M 10/63; H01M 2004/027; H01M 2004/028; H01M 2300/0068; H01M 4/0471; H01M 4/136; H01M 4/1397; H01M 4/368; H01M 4/38; H01M 4/382
See application file for complete search history.

(56) References Cited

U.S. PATENT DOCUMENTS

2016/0365612 A1 * 12/2016 Bradwell ............ H01M 10/615
2019/0006720 A1 *  1/2019 Cheong ................ H01M 50/26

FOREIGN PATENT DOCUMENTS

KR    10-1803240    * 11/2017

OTHER PUBLICATIONS

Mugnaini, Veronica, Extended European Search Report, EP19802560, European Patent Office, dated Feb. 4, 2022.
Mugnaini, Veronica, Extended European Search Report, EP19803861, European Patent Office, dated Feb. 4, 2022.
Mugnaini, Veronica, Extended European Search Report, EP19803864, European Patent Office, dated Feb. 4, 2022.

(Continued)

*Primary Examiner* — Adam A Arciero
(74) *Attorney, Agent, or Firm* — Gavrilovich, Dodd & Lindsey, LLP; Charles D. Gavrilovich, Jr.

(57) ABSTRACT

A battery includes a fluid negative electrode and a fluid positive electrode separated by a solid electrolyte at least when the electrodes and electrolyte are at an operating temperature. The solid electrolyte comprises a salt formed by ions of the negative electrode material forming the fluid negative electrode. In one example, the fluid negative electrode comprises lithium (Li), the fluid positive electrode comprises sulfur (S) and the solid electrolyte comprises lithium iodide (LiI).

20 Claims, 3 Drawing Sheets

(56) References Cited

OTHER PUBLICATIONS

Mugnaini, Veronica, Extended European Search Report, EP19802683, European Patent Office, dated Feb. 4, 2022.
Barbosa, Tatielli Goncalves Gregorio, Search Report, BR122022001296-5, The National Institute of Industrial Property, dated Apr. 25, 2022.
Barbosa, Tatielli Goncalves Gregorio, Search Report, BR112020022189-9, The National Institute of Industrial Property, dated Apr. 25, 2022.
Barbosa, Tatielli Goncalves Gregorio, Search Report, BR112020022183-0, The National Institute of Industrial Property, dated Jun. 28, 2022.
Barbosa, Tatielli Goncalves Gregorio, Search Report, BR112020022184-8, The National Institute of Industrial Property, dated Jun. 29, 2022.
Dawson, J.A., et al. "Atomic-Scale Influence of Grain Boundaries on Li-Ion Conduction in Solid Electrolytes for All-Solid-State Batteries", Journal of the American Chemical Society, vol. 140, No. 1, Dec. 2017, pp. 362-368.
Li, Haomiao; et. al. Liquid Metal Electrodes for Energy Storage Batteries, Advanced Energy Materials, vol. 6, No. 14, pp. 1-19, May 2016.
Manthiram, A., et al., "Lithium battery chemistries enabled by solid-state electrolytes", Nature Reviews Materials, vol. 2, 16103, Feb. 2017.
Schlaikjer, C.R., et al., "Ionic Conduction in Calcium Doped Polycrystalline Lithium Iodide"; Journal of the Electrochemical Society, vol. 118, No. 9, Sep. 1971, pp. 453-458.
Yin, Ya-Xia, et. al., "Lithium-Sulfur Batteries: Electrochemistry, Materials, and Prospects", Angewandte Chemie International Edition, vol. 52, No. 50, pp. 13186-13200, Nov. 2013.

\* cited by examiner

MOLTEN FLUID APPARATUS WITH SOLID NON-BRITTLE ELECTROLYTE

RELATED APPLICATIONS

The application is a continuation of U.S. patent application Ser. No. 15/982,475, entitled "MOLTEN FLUID APPARATUS WITH SOLID NON-BRITTLE ELECTROLYTE", filed on May 17, 2018, and incorporated by reference in its entirety, herein.

STATEMENT REGARDING FEDERALLY SPONSORED RESEARCH OR DEVELOPMENT

This invention was made with Government support under Contract No. DE-AC02-06CH11357 and awarded by the Department of Energy. The Government has certain rights in the invention.

FIELD

This invention generally relates to thermal batteries and more particularly to methods, devices, and systems with molten fluid electrodes with a solid non-brittle electrolyte.

BACKGROUND

A battery generally includes a positive electrode (cathode), a negative electrode (anode) and an electrolyte. A battery typically includes current collectors within the electrodes that direct electrical current to the terminals of the battery. Attempts have been made to use fluids for electrodes where one or both of the electrodes are maintained in a fluid state by heating the electrode material. These batteries are sometimes referred to as thermal batteries or high temperature batteries and include, for example, devices sometimes referred to as liquid-metal batteries and rechargeable liquid-metal batteries. Unfortunately, decades of research and development have not produced a safe and reliable thermal battery using high gravimetric energy density (kWh/kg) electrochemical couples such as, for example, sodium and sulfur or lithium and sulfur.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
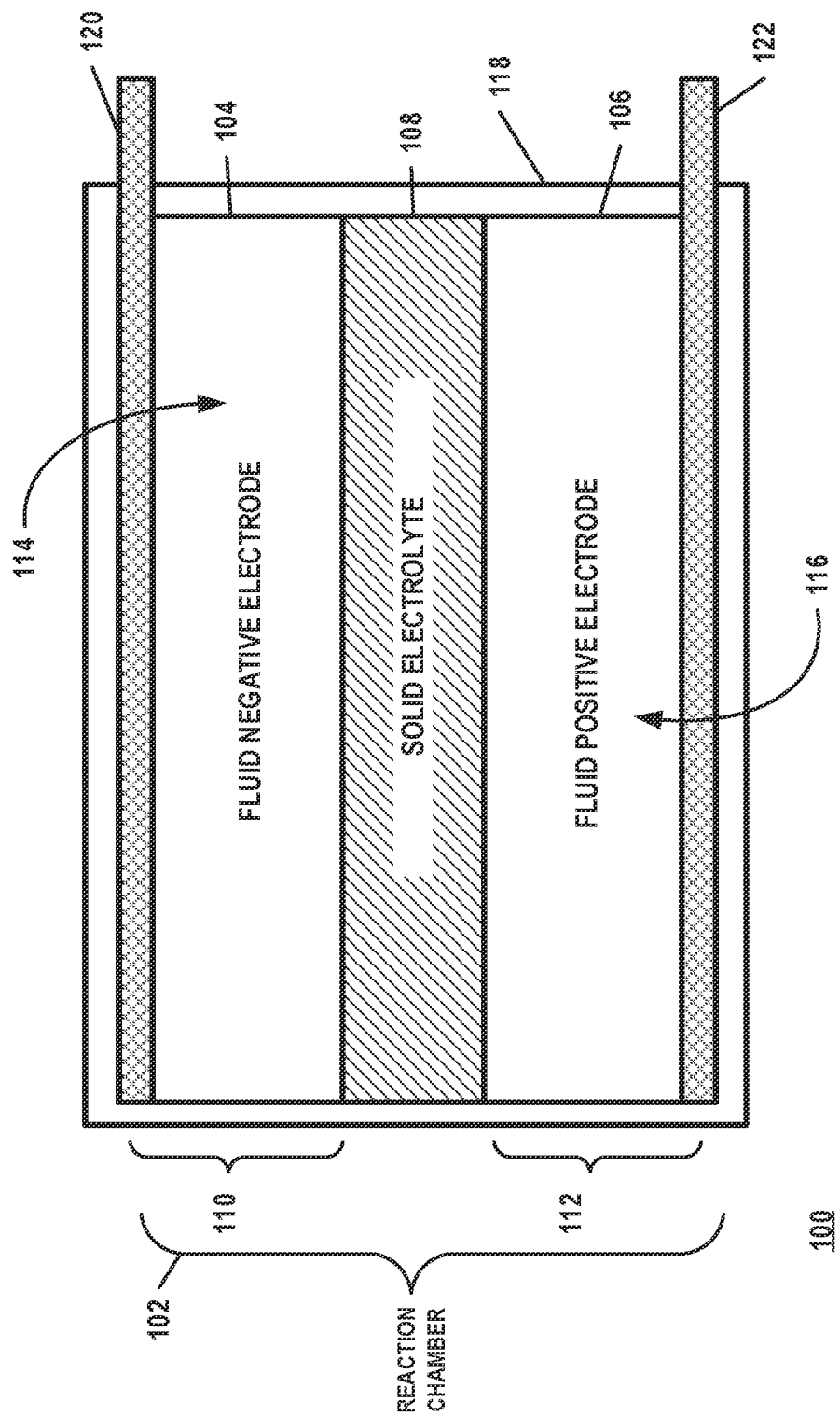
FIG. 1 is a block diagram of an example of a battery including a reaction chamber having fluid electrodes separated by a non-brittle solid electrolyte.

Thermal batteries have several advantages over other types of batteries. The relatively low cost, high energy density, and high power density of thermal batteries (high temperature batteries) make these types of batteries highly attractive for several uses. Unfortunately, the safety issues with these devices have constrained widespread adoption. Due to highly energetic chemistry, thermal batteries have suffered from dangerous risks of fire and explosion. Conventional thermal battery designs include two pools of fluid (i.e., molten) materials separated by a third material. If the third material fails and allows the molten materials to mix and react, an immense amount of thermal energy is released in a short period of time. These conditions often lead to a dangerous fire condition or explosion. This severe limitation still continues today although the demand for a safe thermal battery has existed since its inception of thermal batteries during World War II. Several decades of attempts have not resulted in an adequate solution to the problem. For example, some attempts include using a gravitational flow battery design in which one of the molten active materials is contained in a large reservoir located physically above a smaller reaction chamber where the walls of the reaction chamber are a solid electrolyte. On the other side of the solid electrolyte is a large reservoir of the other molten active material. In the event that the solid electrolyte fails and the two molten active materials are allowed to mix, the hope is that the solid products that are formed by the chemical reaction of the mixing of the two molten active materials will limit the flow of the active materials from the large reservoir located physically above with the other large reservoir of the other molten active material. The gravitational flow battery design attempt fails because the solid products that are intended to block the flow from the upper reservoir do not form into a cohesive mass that is able to block the flow at the operating temperature of the thermal battery. Therefore, the mixing of the two molten active materials is only slowed by this design and is insufficient to prevent a thermal runaway event. Other attempts include changing the chemistry of the molten active materials to a metal halide chemistry such that a solid electrolyte failure does not cause a thermal runaway event. Unfortunately, this technique comes at the cost of decreasing the specific energy density (kWh/kg) and the volumetric energy density (kWh/l) to a point where the thermal battery is no longer a viable solution for many applications.

Research in thermal batteries has even been abandoned by some due to the high danger. For example, a major auto manufacturer developed a fleet of electric vehicles that used thermal sodium-sulfur batteries in 1993. During the testing, two vehicles burst into flames while charging. As a result of these fires, the manufacturer ended its thermal sodium-sulfur battery program and the U.S. Department of Energy stopped funding thermal battery research. This is despite the enormous advantages that a safe thermal battery would provide to the electric vehicle industry as well as other industries. The relative light weight and low cost of thermal batteries clearly make these devices the best choice for use in electric vehicles if the danger of fire is mitigated.

Thermal batteries provide several advantages over other batteries including exhibiting a high gravimetric energy density (kWh/kg), high volumetric energy density, high gravimetric power density, and high volumetric power density at low cost. Conventional thermal batteries with fluid electrodes, however, suffer from a significant safety limitation. The electrolyte separators used in conventional thermal batteries include liquid electrolytes such as molten salts and brittle solid electrolytes such as ceramic and glass. Liquid electrolytes are limited in several ways. For example, during operation of these types of batteries, chemical species of the electrode materials are produced and permeate the electrolyte decreasing performance. Eventually, these byproducts in the electrolyte result in the battery ceasing to operate. Ceramic and glass electrolytes, on the other hand, can easily fail because of their brittle structure. As discussed above, significant fire conditions and explosions occur when the molten electrode materials come in contact with each other after the solid electrolyte separator is breached.

Despite decades of research and development, no thermal battery with fluid electrodes has been proposed that includes a solid electrolyte that is not brittle and susceptible to cracking. Solid electrolytes comprising glass or a ceramic have been the only proposed solid electrolytes for use in a thermal battery with fluid electrodes. These materials have significantly higher melting points than the melting points of the electrodes. As a result, one or both of the electrode materials may enter the gas phase at temperatures approach the melting point of the glass or ceramic electrolyte.

In accordance with the techniques discussed herein, the safety of a thermal battery is maximized by using a solid yet relatively non-brittle electrolyte to separate the fluid electrodes. Within the operating temperature range of the battery, the electrolyte material has a solid yet relatively soft, less brittle structure compared to ceramic and glass, making the electrolyte significantly less susceptible to cracking and fractures than conventional thermal batteries. The electrolyte comprises cations of the negative electrode material and anions. For the examples herein, the anion is selected to be relatively large and chemically stable with the materials within the reaction chamber. Therefore, in the examples, the anion is stable with the negative electrode material, the positive electrode material, and any resulting species of the materials. For a specific example discussed below, the negative electrode comprises lithium and the solid electrolyte is LiI which comprises lithium cations ($Li^+$) and iodide anions ($I^-$). The electrolyte may include other elements and additives in some circumstances. Even where the additives may have a brittle structure, the overall structure of the solid electrolyte in accordance with the techniques discussed herein is less brittle and less susceptible to cracking than ceramic electrolytes and glass electrolytes. By operating the battery at a temperature that is near but below the melting point of the LiI electrolyte, the electrolyte may become soft and may be less susceptible to cracking and fracture. Applying such a technique with electrolyte materials that have significantly higher melting points, greatly increases the complexity and cost of the battery since such implementations need to consider the electrode materials in the gas phase and the increase in material corrosion at these elevated temperatures. Therefore, the example of the lithium sulfur thermal battery with a solid lithium iodide electrolyte provides a safer, low cost thermal battery with high energy densities for use in a variety of applications including electric vehicles.

For the examples discussed below, the positive electrode and the negative electrode are in a fluid state when the battery is at a temperature within an operating temperature range of the battery. In some implementations, however, one of the electrodes may be in a solid state when the battery temperature is within the operating temperature range. In other words, only the positive electrode or the negative electrode is in a fluid state while the other is solid within the operating temperature range. In addition, in some circumstances, the operating temperature range may include temperatures where both electrodes are fluid and temperatures where only one electrode is fluid. When a material is in the fluid state, it is fluid, and when a material is in the non-fluid state, it is non-fluid. For the examples discussed herein, the electrode materials are transitioned from a non-fluid state to a fluid state by heating and can be referred to as molten electrode materials and molten fluid electrode materials.

FIG. 1 is a block diagram of an example of a battery apparatus 100 including a reaction chamber 102 having fluid electrodes 104, 106 separated by a solid electrolyte 108. The illustration in FIG. 1 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 1 may be implemented in separate structures.

As discussed herein, a material is in a fluid state when the material has a consistency sufficiently liquefied to allow the material to flow from one area to another. In other words, the viscosity of a fluid material is such that the material can be directed, pumped, or can otherwise flow from one area to another. A fluid material may, however, have some components that are at least partially solid while others are in a liquid phase. As a result, a fluid material is not necessarily all in a liquid phase. As discussed herein, a material is in a non-fluid state where it is sufficiently solidified such that it cannot flow. In other words, the viscosity of the material in a non-fluid state is such that the material cannot be directed, pumped, or otherwise allowed to flow from one area to another. A non-fluid material, however, may have some components that are in a liquid phase as well as others that are in a solid phase. As referred to herein, a solid electrolyte is any material, mixture, compound, or other combination of materials that forms an electrolyte structure that is in a solid phase. Although the solid electrolyte is in the solid phase within the operating temperature range, the electrolyte material may soften as the temperature approaches its melting point. Therefore, when the solid electrolyte 108 is operated near its melting point and subjected to stress, it can absorb at least some energy prior to fracture and exhibits more plastic deformation than glass and ceramics. In other words, the solid electrolyte 108 is softer and exhibits a higher creep rate than glass and ceramics at the operating temperature of the battery.

The battery 100 includes at least a reaction chamber 102 having a negative electrode region 110 and a positive electrode region 112 separated from the negative electrode region 110 by the solid electrolyte 108. The negative electrode region 110 contains a negative electrode material 114 and the positive electrode region 112 contains a positive electrode material 116. The battery 100 also includes a heating system 118 for sufficiently heating the positive and negative electrode materials in the reaction chamber 102 during operation. The electrode materials 114, 116 are maintained in a fluid state when the battery 100 is operating by heating the electrode materials 114, 116 while maintaining the solid electrolyte 108 in a solid state. Accordingly, the operating temperature of the reaction chamber is below the melting point of the solid electrolyte 108. For the example of FIG. 1, the heating system 118 is an electrical heating system including one or more heating elements that facilitate the heating of the reaction chamber 102 to place and maintain the electrode materials 114, 116 in a fluid state. Other types of heating systems 118 can be used in some circumstances. The heating system heats the reaction chamber such that the negative electrode material 114 and the positive electrode material 116 are in a fluid state while the solid electrolyte 108 is maintained in a solid state.

The solid electrolyte 108 includes at least cations of the negative electrode material 114 and anions where the anion is selected to be relatively large and chemically stable with the materials within the reaction chamber 102. Some examples of negative electrode materials 114 include lithium, sodium, potassium, rubidium, and cesium. Some examples of anions include anions of chorine, bromine and iodine. Other materials can be used in some circumstances.

The fluid negative electrode material 114 in the negative electrode region 110 forms a fluid negative electrode 104 of the battery 100. The fluid positive electrode material 116 in the positive electrode region 112 forms a fluid positive electrode 106 of the battery 100. The fluid electrodes 104, 106 and the electrode materials may include more than a single element. For example, the positive electrode region 112 may also contain some reaction products resulting from the reaction within the battery 100. A first current collector 120 is positioned within the fluid negative electrode 104 and second current collector 122 is positioned within the positive fluid electrode 106. With the properly placed current collectors 120, 122 within each electrode 104, 106, electrical energy can be harnessed from the electrochemical reaction occurring within the battery between the fluid negative electrode 104 and the fluid positive electrode 106 through the solid electrolyte 108. Therefore, the operation of the reaction chamber 102 in the example of FIG. 1 is similar to the operation of conventional thermal batteries. A significant advantage over conventional thermal batteries, however, includes the solid electrolyte that is much more resistant to cracking and breaking compared to conventional solid electrolytes used in thermal batteries. Although solid electrolytes have been suggested, none of the conventional techniques contemplate using a solid electrolyte other than ceramic or glass. As discussed above, such brittle electrolyte materials are susceptible to cracking and failure with dangerous consequences.

The battery apparatus 100 may be implemented with different materials and electrochemical couples. For the example discussed below with reference to FIG. 2, the negative electrode comprises lithium (Li) and the positive electrode comprises sulfur (S). In another example, a sodium-sulfur (NaS) battery includes a fluid negative electrode comprising sodium (Na) and a fluid positive electrode comprising sulfur (S). In addition, other materials may also be used for the electrodes. Further, the electrode materials may contain mixtures or compounds that include multiple elements in some circumstances. For example, in some liquid metal batteries, a molten mixture of sulfur and phosphorus can be used for the fluid positive electrode.

The operating temperature, or temperature ranges, of the negative electrode region and positive electrode region may be selected based on several factors including, for example, the melting point of the negative electrode material, the melting point of the positive electrode material, the boiling point of the negative electrode material, the boiling point of the positive electrode material, the eutectic point of the positive electrode material and resulting chemical species, and the melting point of the solid electrolyte. For the examples discussed herein, the heating system 118 maintains the negative electrode region 110 and the positive electrode region 112 of the reaction chamber 102 at the same temperature in order to avoid a temperature gradient across the solid electrolyte 108. In some situations, the two regions of the reaction chamber may be maintained at different temperatures.

One of the advantages of the examples discussed herein includes having an electrolyte material with a softness at the battery operating temperature that minimizes cracking and fracture. As is known, a material generally becomes softer and exhibits increased flexibility and creep rate under stress at temperatures approaching their melting point. By including an electrolyte that has a melting point that is not significantly, above the operating temperature range of the battery, the electrolyte is maintained in a solid form while exhibiting good sealing properties and increased softness. Accordingly, the electrolyte performs well as a separator that separates and seals the two fluid electrodes from each other while minimizing the chances of a failure as a result of mechanical vibrations or forces. This results in a significant advantage over conventional electrolyte materials used in thermal batteries with fluid electrodes. Glass electrolytes have melting points near 1,700° C. and BASE ceramics have melting points near 2,000° C. These melting points are significantly higher than the boiling points of electrode materials that exhibit high power and energy densities in thermal batteries. As mentioned above, for example, lithium sulfur thermal batteries have high energy and power densities. The boiling point of sulfur is 444.6° C., significantly lower than the melting points of glass and BASE ceramics. Operating a lithium sulfur battery at temperatures near the melting point of conventional electrolytes would place the sulfur in the gas phase complicating the design. As discussed in the example below, however, the advantages of a thermal lithium sulfur battery can be realized while minimizing dangers of electrolyte failure by using an electrolyte material with a lower melting point, greater softness, and better sealing properties than conventional thermal battery electrolyte materials.

Figure 2:
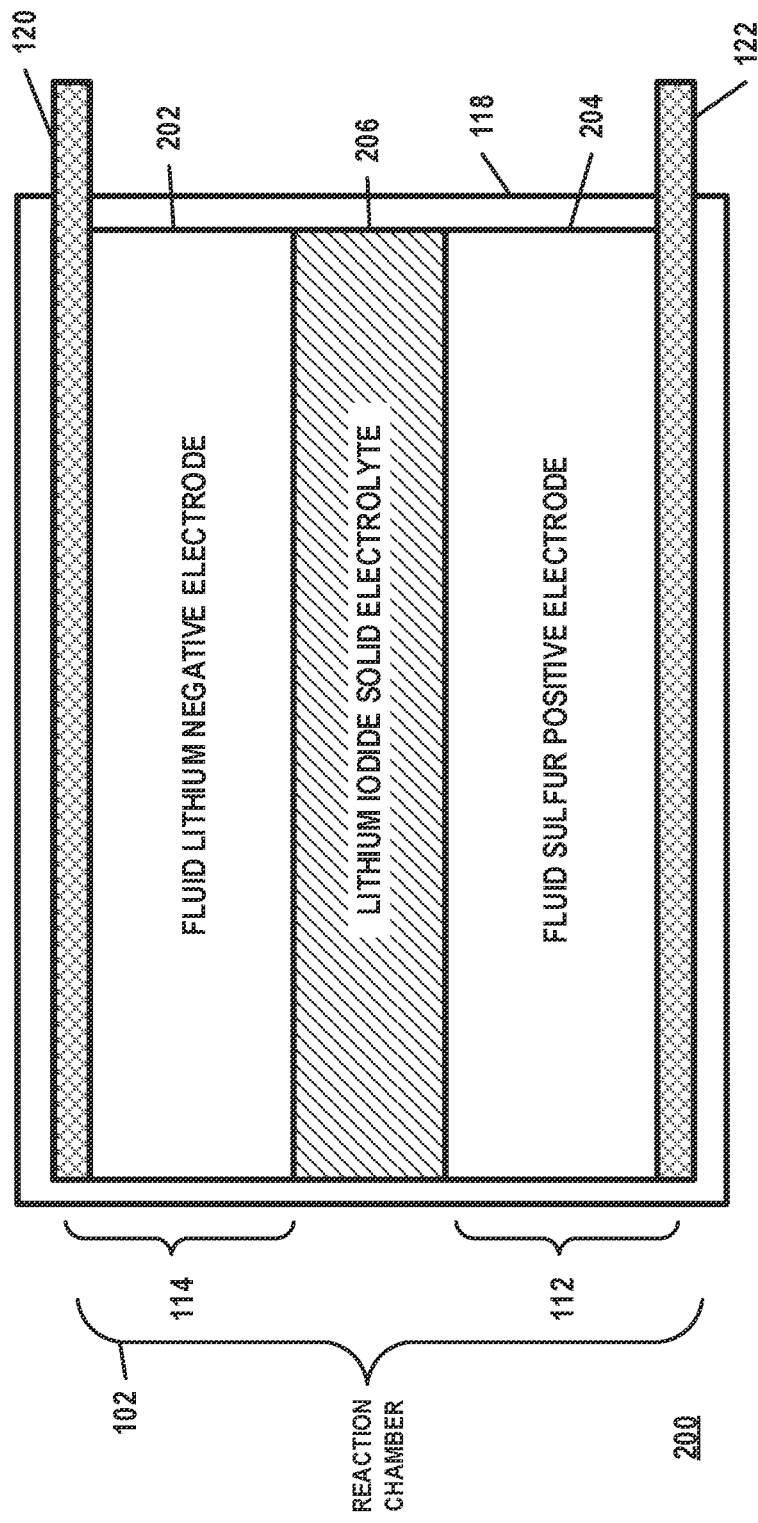
FIG. 2 is a block diagram of an example of a battery including a reaction chamber having fluid electrodes separated by a lithium iodide (LiI) solid electrolyte.

FIG. 2 is a block diagram of an example of a battery 200 including a fluid lithium (Li) negative electrode 202 and a fluid sulfur (S) positive electrode 204 separated by a lithium iodide (LiI) solid electrolyte 206. Accordingly, the battery 200 can be referred to as a lithium-sulfur (LiS) battery and is an example of the battery 100 where the fluid negative electrode 202 comprises lithium, the fluid positive electrode 204 comprises sulfur and the solid electrolyte 206 comprises solid lithium iodide (LiI). The illustration in FIG. 2 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 2 may be implemented in separate structures.

In addition to considerations such as melting point, softness, and cost, selection of an electrolyte material for the US thermal battery includes evaluating ionic transfer properties and the chemical stability of the material with lithium, sulfur and the $Li_2S_m$ species. Experiments performed by the inventor have revealed that lithium iodide is chemically stable with lithium, sulfur and the $Li_2S_m$ species at elevated temperatures.

The operation of the US battery 200 is in accordance with the operation described with reference to the battery 100 of FIG. 1. The heating system 118 maintains the reaction chamber 102 at the appropriate temperature to facilitate the desired reaction between the sulfur and lithium through the lithium iodide electrolyte 206. For the example of FIG. 2, the temperature of the negative electrode region 114 and the positive electrode region 112 is maintained at a temperature around 400 degrees Celsius (° C.). As discussed above, the operating temperature may be based on several factors including the characteristics of the materials of the electrodes and solid electrolyte. For the example of FIG. 2, some of the characteristics that can be considered include the melting point of lithium iodide, 469° C., the boiling point of sulfur, 444.6° C., and the eutectic melting point of lithium polysulfide products ($Li_nS_m$), 365° C. A temperature range that is above the eutectic melting point of lithium polysulfide products but below the melting point of LiI provides the temperature range of 365° C. to 469° C. that can be used in some circumstances. Maintaining the temperature below the boiling point of sulfur may be useful and provide a range of 365° C. to 444° C. that can be used in other circumstances. A suitable temperature range, however, includes temperatures between 375° C. and 425° C. The wider temperature range of 115.21° C. to 469° C. can also be used in still other situations. For the examples herein, the temperatures of the negative electrode region 114 and the positive electrode region 112 are maintained at approximately the same temperature. Among other advantages, such a scheme avoids a temperature gradient across the solid LiI electrolyte 206. In some situations, however, the temperatures may be different between the electrode regions. Other temperature ranges and schemes can be used as long as the electrode materials are fluid and the electrolyte is solid. As a result, the temperature of the positive electrode region 112 should be above the melting point of sulfur, 115.21° C., and the negative electrode region 114 should be above the melting point of lithium, 180.5° C.

During operation of the battery 200, the reaction may result in other compounds or products being formed. For example, in addition to the positive electrode region containing sulfur, the region may also contain di-lithium polysulfide species ($Li_2S_n$ where n is two or higher) and di-lithium sulfide ($Li_2S$). Typically, the reaction through the electrolyte will result is several different chemical species such as $Li_2S_m$ where m is an integer equal to one or more. Any number of chemical species may result and may include, for example $Li_2S$, $Li_2S_2$, $Li_2S_4$, and $Li_2S_6$ products as well as others in some circumstances.

In some situations, additional materials may be added to the positive electrode material and/or to the negative electrode material. For example; phosphorus can be included in the positive electrode material resulting in a fluid phosphorus-sulfur positive electrode. Therefore, another example of the fluid electrode battery apparatus 100 is a lithium phosphorus-sulfur (LiPS) battery. In one example, therefore, the positive electrode material comprises sulfur and, in another example, the positive electrode material comprises sulfur and phosphorous. Examples of suitable temperature ranges for the reservoirs and reaction chamber for a LIPS battery include the ranges discussed above with reference to the LiS battery 200 of FIG. 2.

Therefore, for the example discussed with reference to FIG. 2, the fire danger of a lithium thermal battery is minimized by using a solid lithium iodide (LiI) electrolyte. LiI provides the appropriate electrochemical properties for use as an electrolyte in a thermal lithium battery such as LIS battery while having a melting point adequately above the melting point of lithium, the melting point of sulfur, and the eutectic melting point of lithium polysulfide products ($Li_nS_m$). In addition, the LiI electrolyte is chemically stable with lithium and sulfur as well as with $Li_2S_m$ species. Within the operating temperature range the LiI electrolyte remains solid but exhibits more plastic deformation than glass and more than a ceramic such as BASE because its operating temperature is much closer its melting point.

In some circumstances, therefore, the selection of materials and operational temperature ranges for use in the thermal battery are at least somewhat based on the melting point of the electrolyte material. A useful ratio of a material's temperature is the homologous temperature, $T_H$. The homologous temperature is the ratio of the material's absolute temperature to its absolute melting point temperature. The homologous temperature is very useful because materials behave in similar ways when heated. For instance, when a material's temperature is much lower than its melting point temperature, the material is typically hard and its creep rate under stress is negligible. However, when a material's temperature approaches its melting point, then the material softens and its creep rate under stress increases. As an example, the homologous temperatures for the BASE and sodium borate glass solid electrolyte in a sodium-sulfur battery operating at 350° C. are $0.27T_{MP}$ and $0.32T_{MP}$ respectively. At these homologous temperatures, the BASE and sodium borate glass are hard and exhibit a negligible creep rate under stress. By selecting a combination of materials that result in an operating temperature where at least one electrode is fluid and the electrolyte material is below, but relatively near, its melting point, the solid electrolyte is less brittle and more effectively separates and seals the electrode materials from each other. In most circumstances, the low end of the operating temperature range is at least above 35 percent of the absolute melting point of the solid electrolyte (i.e., $T_H$ of the solid electrolyte is $0.35T_{MP}$). As the low end of the operating temperature range is increased, the electrolyte is likely to have an increased softness and be less brittle. Therefore, the low end may be above 50, 60, 70, or 80 percent of the absolute melting point of the electrolyte (i.e., $T_H=0.5T_{MP}$, $0.6T_{MP}$, $0.7T_{MP}$, $0.8T_{MP}$). In many circumstances, the high end of the operating temperature range may be limited by the boiling point of one of the electrode materials. In order to avoid having the electrode entering the gas phase, the high end of the operating temperature range should at least be lower than the lower boiling points of the positive electrode material and the negative electrode material. In some circumstances, the high end can be less that 98 percent of the lowest electrode material's absolute boiling point. In still other situations, the high end can be less than 95 percent of the lowest electrode material's absolute boiling point.

Figure 3:
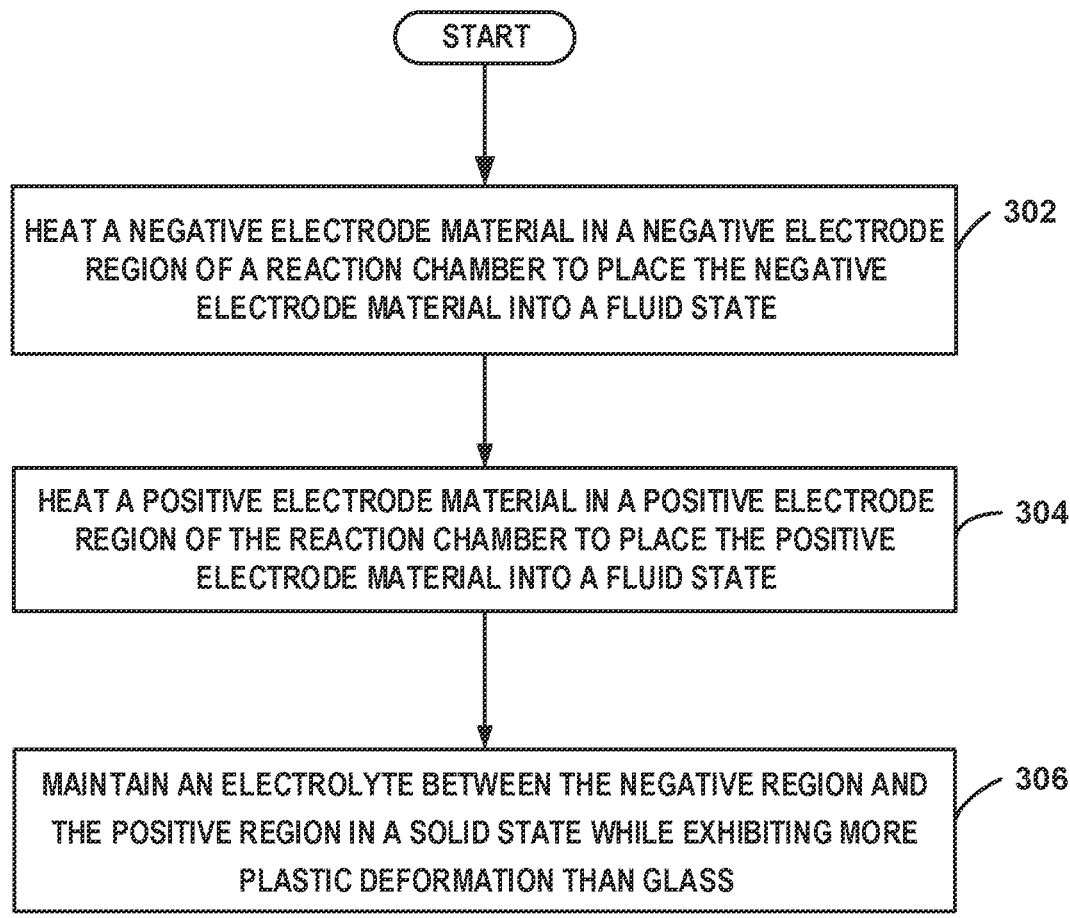
FIG. 3 is a flowchart of an example of a method of operating a fluid electrode battery with a solid non-brittle electrolyte.

Applying these relationships to a lithium sulfur battery, suitable operating temperature ranges are in accordance with those discussed above. For example, operating the US battery with a LiI solid electrolyte in a temperature range of 390° C. to 410° C. is a range that is contained within the range from 89 percent of the absolute melting point of lithium iodide (i.e., $T_H=089T_{MP}$) to 95 percent of the absolute boiling point of sulfur, FIG. 3 is a flowchart of an example of a method of operating a fluid electrode battery. The steps of FIG. 3 can be performed in a different order than shown and some steps may be combined into a single step. Additional steps may be performed and some steps may be omitted. For example, step 302, step 304, and step 306 are performed simultaneously in many circumstances. Although the method may be performed in any apparatus having the appropriate structure, components and materials, the example discussed with reference to FIG. 3 is performed in a thermal battery such as the battery 100 discussed with reference to FIG. 1 or the battery 200 discussed with reference to FIG. 2 above.

At step 302, a negative electrode material is heated to place the negative electrode material in the negative region of the reaction chamber into a fluid state. By adequately heating the negative region of the reaction chamber, a fluid negative electrode is formed from the heated negative electrode material.

At step 304, a positive electrode material is heated to place the positive electrode material in the positive region of the reaction chamber into a fluid state. By adequately heating the positive region of the reaction chamber, a fluid positive electrode is formed from the heated positive electrode material.

At step 306, the electrolyte is maintained in a solid state. The reaction chamber is heated to adequately heat the electrode materials without melting the electrolyte. The solid electrolyte is in a solid state but is less brittle than glass and ceramics. The solid electrolyte, therefore, exhibits more plastic deformation than glass and more than a ceramic within the operating temperature range of the thermal battery because the operating temperature is much closer to the solid electrolyte's melting point.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially or even reversed. In addition, while certain aspects of this disclosure are described as being performed by a single module or component for purposes of clarity, it should be understood that the functions described in this disclosure may be performed by any suitable combination of components.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:
    a negative fluid electrode comprising a negative electrode material, the negative fluid electrode being fluid at least within an operating temperature range of the apparatus, the negative electrode material selected from the group consisting of lithium, sodium, potassium, rubidium, cesium and combinations thereof;
    a positive fluid electrode being fluid at least within the operating temperature range of the apparatus; and
    a solid electrolyte positioned between the negative fluid electrode and the positive fluid electrode and extending from the negative fluid electrode to the positive fluid electrode, the solid electrolyte comprising cations of the negative electrode material and an anion selected from the group consisting of chorine, bromine, fluorine, iodine, and combinations thereof, the solid electrolyte in a solid state at least within the operating temperature range of the apparatus, the operating temperature range of the apparatus contained within a range between 30 percent of an absolute melting point of the solid electrolyte and the absolute melting point.

2. The apparatus of claim 1, wherein the operating temperature range is contained within a range between 30 percent of the absolute melting point of the solid electrolyte and 98 percent of the absolute melting point.

3. The apparatus of claim 2, wherein the operating temperature range is contained within a range between 40 percent of the absolute melting point of the solid electrolyte and 95 percent of the absolute melting point.

4. The apparatus of claim 3, wherein the operating temperature range is contained within a range between 50 percent of the absolute melting point of the solid electrolyte and 95 percent of the absolute melting point.

5. The apparatus of claim 4, wherein the operating temperature range is contained within a range between 70 percent of the absolute melting point of the solid electrolyte and 95 percent of the absolute melting point.

6. The apparatus of claim 5, wherein the operating temperature range is contained within a range between 80 percent of the absolute melting point of the solid electrolyte and 95 percent of the absolute melting point.

7. The apparatus of claim 6, wherein the operating temperature range is contained within a range between 89 percent of the absolute melting point of the solid electrolyte and 95 percent of the absolute melting point.

8. The apparatus of claim 1, wherein an upper temperature of the operating temperature range is below a lowest boiling point of a positive electrode boiling point at one atmosphere of pressure of the positive fluid electrode and a negative electrode boiling point at one atmosphere of pressure of the fluid negative electrode.

9. The apparatus of claim 8, wherein the upper temperature of the operating temperature range is below 98 percent of the lowest absolute boiling point of a positive electrode absolute boiling point at one atmosphere of pressure of the positive fluid electrode and a negative electrode absolute boiling point at one atmosphere of pressure of the fluid negative electrode.

10. An apparatus comprising:
    a negative fluid electrode comprising lithium, at least a portion of the negative fluid electrode being fluid at least within an operating temperature of the apparatus;
    a positive fluid electrode comprising sulfur, at least a portion of the positive fluid electrode being fluid at least within the operating temperature of the apparatus; and
    a solid electrolyte positioned between the negative fluid electrode and the positive fluid electrode and extending from the negative fluid electrode to the positive fluid electrode, the solid electrolyte comprising a salt formed with lithium cations and being solid at least within the operating temperature of the apparatus.

11. The apparatus of claim 10, wherein the operating temperature range of the apparatus is contained with the range of 365° C. to 469° C.

12. The apparatus of claim 11, wherein the operating temperature range of the apparatus is contained with the range of 375° C. to 444° C.

13. The apparatus of claim 11, wherein the operating temperature range of the apparatus is contained with the range of 390° C. to 425° C.

14. The apparatus of claim 10, further comprising:
    a heating system arranged and configured to heat the fluid negative electrode, the fluid positive electrode and the solid electrolyte to an operating temperature of the apparatus.

15. An apparatus comprising:
    a negative fluid electrode comprising a negative electrode material, at least a portion of the negative fluid electrode being fluid at least within an operating temperature range of the apparatus, the negative electrode material selected from the group consisting of lithium, sodium, potassium, rubidium, cesium and combinations thereof;

a positive fluid electrode, at least a portion of the positive fluid electrode being fluid at least within the operating temperature range of the apparatus; and an electrolyte positioned between the negative fluid electrode and the positive fluid electrode and extending from the negative fluid electrode to the positive fluid electrode, the electrolyte comprising a salt formed with cations of the negative electrode material and an anion selected from the group consisting of chorine, bromine, fluorine, iodine, and combinations thereof, at least a portion of the electrolyte in a solid state at least within the operating temperature range of the apparatus, the portion comprising a first area in contact with the negative electrode and a second area in contact with the positive electrode.

16. The apparatus of claim 15, wherein the operating temperature range of the apparatus is contained within the range between 30 percent of the absolute melting point of the electrolyte and 98 percent of the absolute melting point.

17. The apparatus of claim 16, wherein the operating temperature range of the apparatus is contained within the range between 50 percent of the absolute melting point of the electrolyte and 95 percent of the absolute melting point.

18. The apparatus of claim 17, wherein the operating temperature range of the apparatus is contained within the range between 70 percent of the absolute melting point of the electrolyte and 95 percent of the absolute melting point.

19. The apparatus of claim 15, wherein the salt comprises lithium iodide (LiI).

20. The apparatus of claim 15, wherein the negative electrode material comprises lithium (Li).

* * * * *